United States Patent [19]
Clasen

[11] 3,804,376
[45] Apr. 16, 1974

[54] DEVICE FOR HANDLING FLOWABLE MATERIALS

[76] Inventor: Heinrich Clasen, Wiesenweg 8, 3111 Gr. Liedern, Germany

[22] Filed: June 21, 1972

[21] Appl. No.: 264,792

[30] Foreign Application Priority Data
Nov. 26, 1970 Germany.......................... 2058071

[52] U.S. Cl. ................................................. 259/4
[51] Int. Cl............................................ B01f 15/02
[58] Field of Search............................ 259/4, 18, 36

[56] References Cited
UNITED STATES PATENTS
| | | | |
|---|---|---|---|
| 3,286,992 | 11/1966 | Armeniades | 259/4 |
| 3,328,003 | 6/1967 | Chisholm | 259/4 |
| 3,704,006 | 11/1972 | Grout | 259/4 |
| 3,406,947 | 10/1968 | Harder | 259/4 |

*Primary Examiner*—Robert W. Jenkins
*Attorney, Agent, or Firm*—Murray Schaffer

[57] ABSTRACT

The invention relates to a device for handling flowable material as fluids and/or powdery substance especially for mixing, homogenizing or kneding while the media are flowing. The device consists essentially of the hollow cylindrical tube and a plurality of helically wound sheet-like elements extending in series longitudinally within the tube. Each element extends to the tube walls throughout its length and divides the tube into different passageways for said fluid. In the device according to the present invention the helically wound sheet-like elements are each provided with a flat extension portion at least at one end extending in the longitudinal direction of the tube element. The sheet-like elements further comprise at least at one of their opposite ends a slot for intermesing with the proceeding or the following sheet-like element. The arrangement is such that there are provided, in the region of the intermeshing, four channels or passageways around the longitudinal axis of the tube element for the flow of fluid.

9 Claims, 5 Drawing Figures

PATENTED APR 16 1974 3,804,376

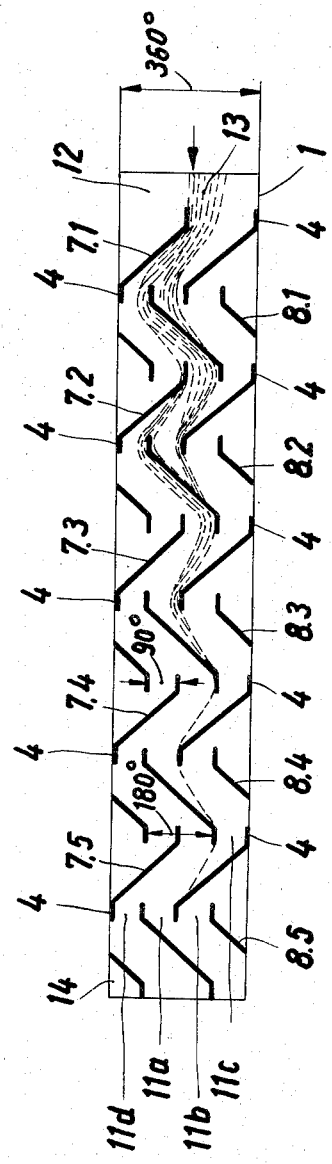
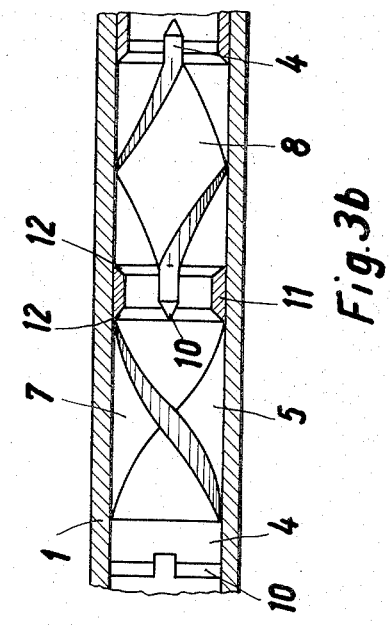
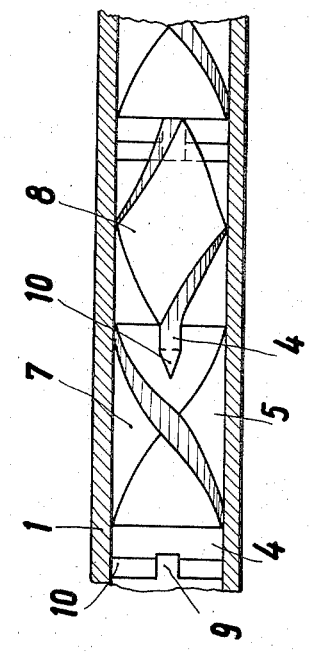
Fig.5
Fig.3b
Fig.3a

DEVICE FOR HANDLING FLOWABLE MATERIALS

BACKGROUND OF THE INVENTION

This invention relates to a device for handling flowable materials such as fluids and/or powders, especially for mixing, homogenizing or kneding the fluids while conveying them.

A number of devices are known for mixing liquid resin components to form a viscous resin product. Among these there are devices consisting essentially of a hollow cylindrical tube and a plurality of curved sheet-like elements extending in series longitudinally within that tube throughout the length thereof, each element extending to the tube walls throughout its length and dividing the tube into two separated channels. The elements are arranged alternately and in point-contact with each other and have a curvature to turn the direction of the flowing fluid. The edges of each element transverse of the tube and are positioned at an angle to the contacting edges of the adjacent elements, the total cross-sectional area of said two channels being substantially constant throughout the length of the tube, as shown in U.S. Pat. No. 3,286,992. With this known device a great number of sheet-like elements is necessary when high viscous fluids are to be mixed thoroughly so that the mixing path will be very long. Difficulties arise when the elements are to be brought in point-contact with each other due to the fact that they can hardly be fixed to each other at the points of contact. Even welding offers in this case no satisfying solution as the elements undergo a deformation. The result is that there will arise secondary steams besides the main flow leading to a significant loss of energy. With the known device the flow will be twisted only partly according to the configuration of the sheet-like elements so that the efficiency is low for high viscous media. A great number of curved sheet-like elements are necessary as well as a very long mixing path. Furthermore, the known device is not adapted to destroy agglomerate without the help of additional means.

With this invention there is provided a device which avoids the deficiencies of the prior art and is adapted to have a higher mixing efficiency without any additional energy and without creating secondary flow patterns.

OF THE INVENTION

These and other results are achieved by the present invention in forming a new device in which the helically wound sheet-like elements are each provided with at least one flat portion extending in the direction of the longitudinal axis of the tube and in which the sheet-like elements are provided at least at one of the ends facing each other with a slot for inserting the following sheet-like elements and for dividing the total cross-section area of the tube into four flow passages arranged around the longitudinal axis of the tube.

The device of the present invention is adapted to generate a pulsating flow due to the fact that the cross-sectional area in the region of ¼-cross-sectional passageways is smaller than in the other regions or portions of the sheet-like elements. Furthermore, the passageways of ½-cross-sectional area generated by the helically wound path of the sheet-like elements will be divided each in the region of transient to the next element so that a very thorough mixing of the fluids will be achieved. The flow will not undergo an abrupt changing of flow direction due to the intermeshing of the ends of two elements. The creation of secondary flow pattern will thus be effectively avoided. On the other hand the increase in flow in the region where the ends of the elements will overlap (i.e. where the cross-section is divided into four passageways parenthesis will influence the flow within the following ½-cross-sectional passageways formed by the helically wound sheet-like elements. In the overlapping region the guiding surfaces of the flat extensions form with the following portion of the helically wound element an angle which, as seen in flow direction, is positive or negative. This leads locally to differences in pressure and in pattern and rate of flow. These differences influence the fluids in the ½-cross-sectional passageways in such a way that the flow thread leaving one of the ¼-cross-sectional passageways will follow the helical path of the following element over its full length while the flowing thread from the other ¼-cross-sectional passageway will approach the wall of the helically wound element to a very small extent only. Thus, very favourable mixing conditions will be achieved which in practice will be made visible by using a transparent tube and dyeing the fluids to be mixed in different colours.

A further advantage of the new device may be seen in the fact that the elements following each other are fixed to each other in a very easy and effective way. Conveniently the helically wound sheet-like elements are provided with flat extending portions at both of their ends. In this way one-fourth-cross-sectional passageway in the overlapping regions of the ends of elements will be achieved having a constant cross-section area and leading to a more favourable transition of flow threads from one element to the following element. This will be particularly effective when the following elements show opposite twist directions. The elements should overlap each other at least over the full length of the flat portions. But the overlapping may be choosen to a smaller or greater extent. By choosing a different rate of overlapping the stream pattern may be influenced as desired not only in the overlapping region but also in the following passageway. In this connection it should be noted that generally the flat extensions of the elements should have a length in the direction of longitudinal axis of the tube which is smaller than the length of the helically wound portions of the element.

In a preferred form of the new device, particularly useful for highly viscous fluids the helically wound portions comprise a twist of about 180° in the longitudinal direction of tube while the flat extensions together with the adjacent sheet-like elements form an angle of about 90° in the region of intermeshing.

The elements may be intermeshed loosely so that the may be arranged in flexible tubes. On the other hand the elements may be fixed to each other. Such fixing may be achieved without difficulty because the elements may be welded to each other in the region of overlapping and may then be mounted into a metallic tube by shrinking.

Depending on the nature and/or consistancy of the fluid or fluids it may be of advantage to provide, in addition to a continuous changing of the direction of flow, the division as the flow into flowing threads of ½-cross-section and ¼-cross-section restrictions, so that a local increase in the rate of flow will be achieved. Thus, the overlapping portions of the elements may be surrounded by a ring-element which may be power-coupled to the overlapping portions. The surfaces of the ring-element as well as the surfaces of the sheet-like elements facing upstream may be tapered or formed edge-like to avoid local stagnation of flow or swirling motion.

The results described above are accomplished by arangement and configuration hereinafter described and illustrated in the accompanying drawings which are to be considered as exemplary rather than limiting.

BRIEF DESCRIPTION OF DRAWINGS

FIGS. 3a and 3b show each a further example of the new device in a longitudinal section.

FIG. 5 is a view of longitudinally cut and then developed into the plane of drawing of the arrangement of FIG. 3.

DESCRIPTION OF THE INVENTION

Figure 1:
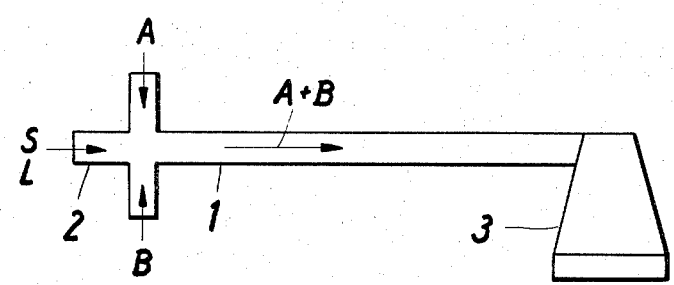
FIG. 1 is a schematic view showing one possibility of using the device of this invention.
Figure 2:
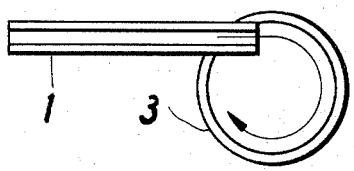
FIG. 2 is a horizontal section through the right hand part of the arrangement of FIG. 1.

From FIGS. 1 and 2 it can be seen that a tube-like element 1 containing the helically wound sheet-like elements, is connected at the upstream side with a T-piece coupling 2 through which the fluids A and B to be mixed and a cleansing fluid S or Air L may be fed. The media, which, when the inlet for cleansing fluid S and air L are closed consist only of the fluids A and B will exit from tube element 1 into a trompet-like tube 3 the cross-section of which increases in the direction of its bottom side. The mixture A and B enters tangentially into tube 3 as shown in FIG. 2 so that the flow leaving tube element 1 will follow a circular path along the inner wall of tube 3 as seen by the arrow. Thus, it is possible to feed the mixture into open moulds nearly without any pressure.

Figure 3:
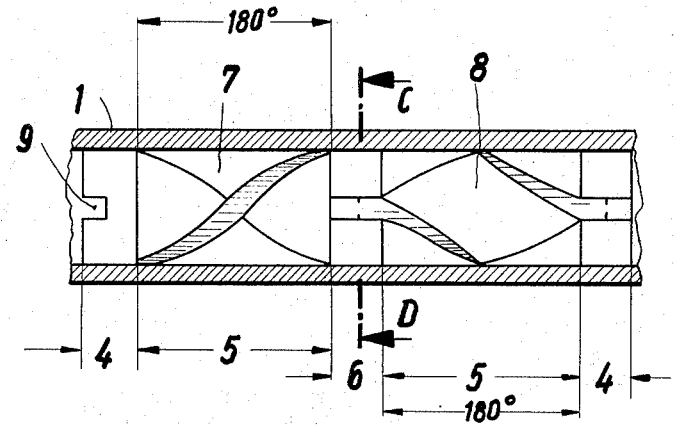
FIG. 3 is an axial section through a part of the new device.

The FIGS. 3, 3a and 3b show different forms of execution of the tube-like element 1.

Figure 4:
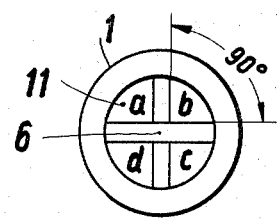
FIG. 4 is a cross-sectional view along line C–D of FIG. 3.

As FIG. 3 shows, the tube-like element 1 contains helically wound sheet-like elements 7 and 8 and in continuation of the tube-elements towards the right side in the drawing further such sheet-like elements. The sheet-like elements each comprise a helically wound portion 5 and a flat extension 4 extending in the direction of longitudinal axis of the tube. The flat portions 4 are clearly limited against and distinguished from the helically wound portions 5 and run in the axial direction along a straight line. The flat extension portions overlap each other in the region of transferring from one sheet-like element to the next one. They form in this regions a cross-like configuration 6. One such configuration is shown in the middle of FIG. 3 as well as in cross-section in FIG. 4. In this region of cross-like configuration 6 four separate passageways a, b, c and d are obtained which are arranged around the longitudinal axis of the tube as clearly shown in FIG. 4. The inner width of the tube-like element 1 is divided into two passageways each having ½ circuler outline, in the region of the helically wound portion 5 of the elements 7 and 8. Thus, seen in direction of flow there is a continuation of alternating cross-section areas so that the cross-section changes from ½ circular outline to ¼ circular outline and vice versa.

To achieve the cross-like configuration 6 the flat extension 4 of the sheet-like elements 7 and 8 are provided with slots 9. This arrangement is choosen in such a way that the helically wound portions of the sheet-like elements have a twist of 180° each while the flat extensions 4 at the overlapping portions 6 limit an angle of 90°.

In the modified example as shown in FIG. 3a the sheet-like elements 7 and 8 which, as before, are arranged within the tube-like element 1 comprise a flat extension portion 4 only at one of their ends while the helically wound portions 5 extend to the other end of the sheet-like element.

There, the helically wound portion overlaps the flat extension-portion 4 of the sheet-like element 8 following in flow direction.

In this example the slots 9 in the flat extension portions 4 work together with the slots in the helically wound portions 5 of the elements 7 and 8 facing each other in such a way that the desired amount of overlap or intermeshing is achieved.

As FIG. 3a shows further the flat extension portions 4 are provided with edge-like tapers 10 each at their surfaces facing upstream.

A further modified example is shown in FIG. 3b, which example shows generally the same features as the example according to FIG. 3. Contrary to the example according to FIG. 3 the tube-like element 1 contains ring-like elements 11 which are arranged in the region of cross-like configuration, i.e in the region of the intermeshing portions of the sheet-like elements. In the example shown the overlapping portions of the sheet-like elements are power-connected or welded to the surrounding ring element.

The ring elements 11 are provided with tapering or edge-like ends 12 to achieve a better guiding of the flow. The taper is provided on both ends of each ring so that local stagnation is avoided at the end 12 of the rings 11 as well as at the tapered end 10 of the flat extensions 4 of the sheet-like elements 7 and 8.

In the examples of FIGS. 3, 3a and 3b the sheet-like element 7 shown on the left portion of the drawing is assumed to be the starting element, i.e. without any intermeshing zone with a preceeding element. The reason for this is only for better showing the configuration of one end of a sheet-like element.

From the drawings it can clearly be derived that the flat extension portion 4 of the sheet-like element comprise a length in the direction of the longitudinal axis of the tube-like element 1 which is smaller than the length of the helically wound portions.

The operation of the new device can clearly be derived from FIG. 5 which shows a tube-like element according to FIG. 3 cut longitudinally and developed into the plane of drawing. In this Figure the streamlines and the mixing effect within the different flow threads are made visible by using dyed fluids of different colour.

With the example shown in FIG. 5 the sheet-like elements 7.1 to 7.5 show a right twist whereas the sheet-like element 8.1 to 8.5 show a left one. In the left hand section of this FIG. 4¼-cross-sectional passageways 11a to 11c are shown which are achieved in the region of cross-like configuration between the flat extension portion 4. The inlet end of the tube-like element 1 is marked by an arrow showing the flow direction. At the inlet end there is fed an undyed fluid 12 as well as a fluid 13 which is assumed to be dyed in red colour and is shown with interrupted lines. Both fluids are intermixed in the portion of the tube-like element 1 shown in FIG. 5 and leave this portion as a homogenous mixture 14.

In the transient region between sheet-like element 7.1 and 8.1 the flat extension portion 4 and the helically wound portion limit a negative angle when looking in flowing direction so that the fluid 13 will follow closely the wall of the helically wound portion along its total length. Accordingly, a corresponding behaviour is shown at the element 8.2. Contrary to that a positive angle is limited within the helically wound portions and the flat extensions as regards the elements 7.2 and 7.3. This angle results in a clearly shown distance between the flow thread of the red fluid 13 and the wall of the helically wound portion. FIG. 5 thus shows clearly the different flowing paths of fluids 12 and 13 conveyed through the tube-like portion shown. Reaching the sheet-like elements 7.4, 8.4 and 7.5 the flow threads of the red fluid 13 are reduced to very thin threads which are hardly to be distinguished while at the sheet-like element 7.5 the flow thread can be seen no further. Thus, with the new device there can be claimed a fast increasing fading of the colour intensity of the red fluid 13. The mixing process as shown is going on in the same way also regarding the colourless fluid 12. This cannot be seen in FIG. 5 only due to the lacking of any distinguishing colour for this fluid. In any case at the end of the shown mixing section of tube-like element 1 there cannot be detected in the mixed mass any red coloured flow threads.

As FIG. 5 shows the flow from the ½ cross-sectional passageways and limited by the helically wound portions of the sheet-like elements will be each divided. Due to this dividing and in connection with differences in the pressure, flow paths are achieved which preferably tend to cling to or remain adjacent to one of the two sides of the helically wound portion of the sheet-like element. Especially in the region of sheet-like element 7.2 of FIG. 5 there can be seen also a division of the flow paths for flow thread at the helically wound portion. Through this division the previously mentioned great differences in the length of path will be obtained which favourably affect the intense mixing without a remarkable high need of energy or a remarkable stagnation in the flow.

Tests have shown that the device described is excellently usable fr mixing the components of polyurethane for producing foamed plastic. The test further showed that without any additional or auxiliary means a defect-free final product with homogenous porosity will be obtained with a considerably short mixing path.

The device described is usable not only for liquid or pasty fluids but also for powdery material sufficient flowable which may afford a more extended configuration of the sheet-like elements. The new device is, particularly with respect to the very extending contacting surfaces, useful not only for mixing and kneading as well as homogenizing but also for heat exchanging when the elements are made of metal material. The device further can be used for mixing liquid and gaseous media and for cutting and mixing when the sheet-like element are provided with knife-edged shaped ends 10.

It may be mentioned that the new device may also be used for conditioning water in which it is often important to mix the water with a sufficient amount of oxygen in the form of smallest gas perls or vesicles.

Besides the possibility of obtaining a thorough and fine divided mixture of two different components the new device is especially useful for mixing components one of which amounts only to a very small fraction of the other component and in which the two components to be mixed have different specific weights. The mixing of such fluids results, as known, in remarkable difficulties with pastry fluids as well as with solid material.

The new device may be cleaned after use in a very simple way as only a cleansing fluid has to be fed thru it. Due to the intense mixing effect when the cleansing fluid flows through the device all corners and surfaces will certainly be reached by the cleansing fluid.

Many modifications within the scope of the appended claims will be evident to those skilled in the art.

What is claimed is:

1. Apparatus for handling flowable media as fluids and/or powdery substances, especially for mixing, homogenizing as well as kneading the media conveyed therethrough, comprising an elongated tube having a plurality of helically wound sheet-like elements arranged therein one behind the other to form a row of elements, each of said elements having its longitudinal edges adjacent the inner wall of the tube-like element forming two flow passageways, the leading edge and the trailing edge of adjacent elements forming an angle in a plane transverse to the longitudinal axis of said tube, each of said elements having a flat end portion at least at one of its leading and trailing edges extending in the longitudinal direction of said tube, said end portion having a slot for receiving the adjacent element in said row, said slot extending longitudinally to an extent so that said adjacent elements intermesh for a length at least equal to the length of the flat end portion thereby fixing said adjacent elements with respect to each other and forming four flow passageways therebetween, the total cross sectional area of which is smaller than that of the two flow passageways.

2. The apparatus according to claim 1, wherein the slots in the end portion extends along the longitudinal center line of the elements.

3. The apparatus according to claim 1 wherein the flat extension portions have a smaller length in the longitudinal direction than the helically wound portions of the elements.

4. The apparatus according to claim 1 wherein the helically wound portions of the sheet-like elements are twisted in longitudinal direction over an angle of about 180° and wherein the region of intermeshing, the flat extension portions each form an angle of about 90° with the edge of the adjacent element.

5. The apparatus in accordance with claim 1 wherein in the intermeshing regions the elements are loosely held in intermeshing configuration.

6. The apparatus according to claim 1 wherein the sheet-like elements are secured to each other.

7. The apparatus according to claim 1 wherein the intermeshing portions of the elements are surrounded by a ring-like element, contained within the tube.

8. The apparatus according to claim 7, wherein the intermeshing portions of the elements are connected to the ring element.

9. The apparatus according to claim 1 wherein the elements are provided with a knife-edged end at least at the ends facing upstream.

* * * * *